May 7, 1957        O. E. ANDRUS        2,791,204
WATER HEATER UTILIZING HEAT OF CRYSTALLIZATION
Filed Aug. 16, 1951
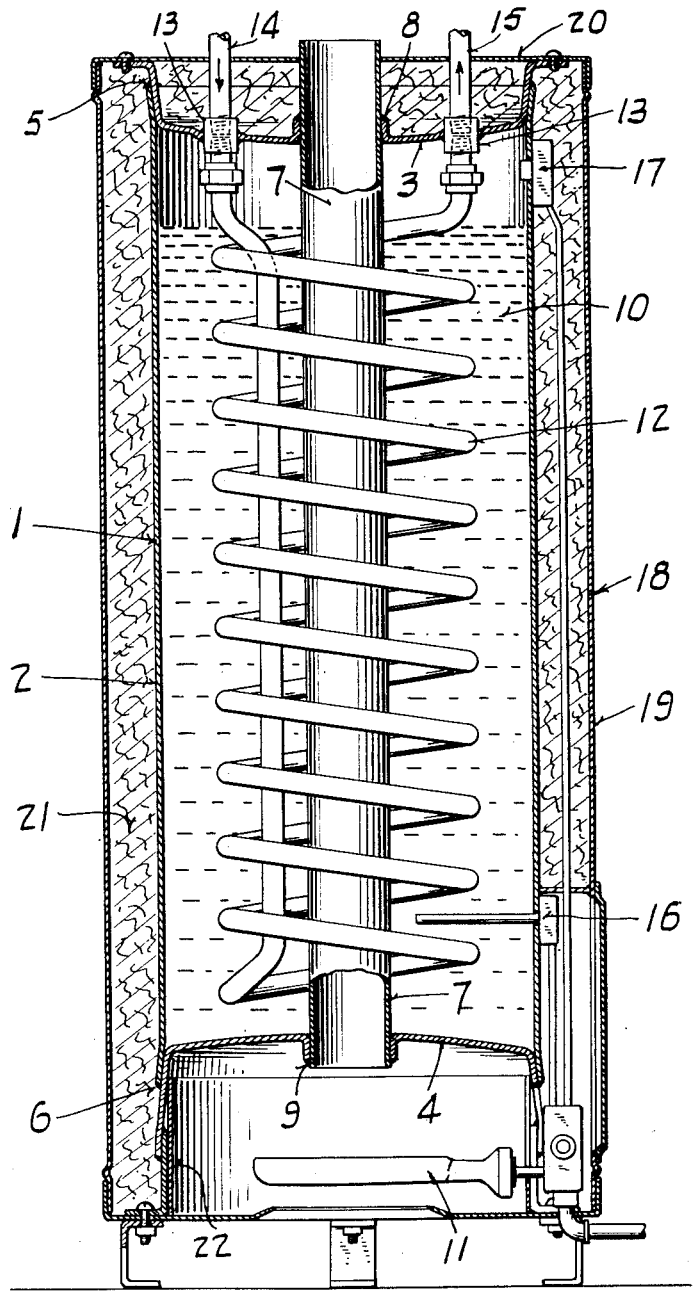
INVENTOR.
*Orrin E. Andrus*
BY *Andrus & Sceales*
ATTORNEYS.

United States Patent Office 2,791,204
Patented May 7, 1957

2,791,204

WATER HEATER UTILIZING HEAT OF CRYSTALLIZATION

Orrin E. Andrus, Milwaukee, Wis., assignor to A. O. Smith Corporation, Milwaukee, Wis., a corporation of New York Application August 16, 1951, Serial No. 242,127

3 Claims. (Cl. 122—33)

The present invention relates to water heaters and more particularly to a water heater utilizing a molten salt or equivalent medium capable of storing heat and evolving it when crystallizing.

An object of the present invention is to provide a water heater which, for a given hot water output capacity, has dimensions far smaller than the conventional water heater which stores hot water.

Another object of the invention is to provide an inexpensive, structurally simple water heater wherein tank corrosion and scale formation are substantially eliminated and the life of the heater unit is extended.

Another object is to provide a heat storage type water heater wherein heat is intermittently stored within a salt medium and is transferred to the water as the water is made to flow through the heater to heat the water to a substantially constant temperature approximating that of the solidification temperature of the salt.

Another object is to provide a water heater having a burner or other heat source capable of supplying heat to a salt heat transfer medium at a ratio exceeding the heat withdrawal from the salt with the molten crystallizable salt serving to transfer heat from the heat source to the water as it flows through the heater so that the exit water will have a substantially constant temperature approximating that of the solidification temperature of salt.

A further object is to provide a safe water heater installation by provision of a heat storage medium operating under pressures less than that found in the usual city water system.

Another object is to lessen the quantity of metals and insulating materials required in the tank by decrease of areas and thicknesses from that in the usual heater.

In the ordinary water heater, the water is contained and heated in a tank which has a large storage capacity in order to handle peak demands. The heater is operated under temperatures and pressures approaching those found in a steam boiler and likewise presents a possible hazard from the standpoint of explosion.

In addition, the hot water containing storage tank is subject to corrosion and scale deposits, particularly in those surfaces subjected to high temperatures. To prevent or minimize corrosion of the tank surfaces numerous surface coatings and protective methods have been employed in connection with the tank.

The present invention virtually eliminates the aforementioned problems by providing a tank or container, preferably hermetically sealed, and containing a quantity of a non-corrosive storage medium which is capable of releasing heat of crystallization at a temperature within the range of about 140° F. to 212° F. The medium is heated by any suitable means to a temperature slightly above its crystallization temperature, and on cooling, the medium crystallizes from the liquid state with evolution of heat. Water is circulated through a conduit in contact with the medium. Such a conduit may consist of a coil of tubing disposed within the tank and arranged so that the heat of crystallization is transferred from the medium to the circulating water.

The heat storage medium contained in the tank has a considerably greater capacity than would an equal volume of water. Thus the size of the tank of the present invention is proportionally smaller than a conventional water storage type heater and yet retains the same delivery capacity of hot water. This smaller unit, having less surface area, has less heat loss and requires less insulating material.

As the tank of the present invention is sealed to the atmosphere and contains a non-corrosive heat storage medium, the danger of corrosion to the tank surfaces is eliminated. Furthermore, there is no scale formation in the tank, in contrast to a hot water containing storage tank in which scale formation is likely to occur, particularly in the area adjacent to the heating means.

Other objects will appear hereinafter in connection with the embodiment of the invention illustrated in the accompanying drawing.

The single figure of the drawing is a vertical section of a water heater constructed in accordance with the present invention.

The invention is illustrated as applied to a gas water heater. Referring to the drawing there is shown a water heater particularly adapted for domestic service comprising a hermetically sealed tank 1 which includes a generally cylindrical body section 2 having outwardly flared ends to receive the heads 3 and 4, which are secured to the body section 2 by welds 5 and 6 respectively. Each of heads 3 and 4 is formed with an axial opening to receive a flue pipe 7 which extends the length of tank 1 and is welded to the respective heads as indicated at 8 and 9.

Tank 1 is adapted to contain a non-corrosive heat storage medium 10, such as a salt or salts, which will crystallize from the liquid state at a temperature within the range of about 140° F. to 212° F., if the water to be heated is at atmospheric pressure at sea level with evolution of heat. The body section 2 of tank 1 may be formed with a downwardly tapered configuration, if desired, to allow for movement of the solid medium 10 under the force of expansion as heat is supplied to the medium to melt the same.

A salt having a crystallization temperature below 140° F. is generally ineffective as a heat storage medium, for the desired temperature of the heated water for most domestic purposes is usually above 140° F.

A salt having a crystallization temperature of over 212° F. is economically undesirable if the water to be heated is at atmospheric pressure at sea level, as such temperatures would cause steam to accompany the hot water issuing from the heater outlet which would be undesirable and represent an unnecessary waste.

As the tank 1 contains the non-corrosive salt 10 and is hermetically sealed so that oxygen and carbon dioxide cannot enter, there is no necessity to provide corrosion protection for the tank. Therefore, the tank may be constructed of carbon steel or any inexpensive suitable material. However, in the case of some salts which may react with steel at temperatures above 212° F. it may be desirable to employ a bottom head 4 made of a metal which will not react with the salt at the temperatures found in the bottom head in the vicinity of the heating source.

Also it is desirable to employ a salt which will crystallize at a suitable temperature and which will release the maximum heat per unit volume as it crystallizes so that tank 1 may be the minimum in dimensions.

In choosing salts it is necessary to select those which are permanently stable for the temperature range employed and which will not decompose when in contact with heated surfaces.

Magnesium nitrate, $Mg(NO_3)_2 \cdot 6H_2O$, is an example of a salt which may be employed as the heat storage medium. Magnesium nitrate has a density of 91 pounds per square foot, a specific heat of .887 B. t. u. per pound per ° F., and crystallizes from a liquid state at a temperature of 190° F. with the evolution of 69 B. t. u. per pound.

A space is provided above the salt in the tank to allow for expansion of the salt with temperature rise. If desired, an inert gas such as nitrogen, may be introduced into tank 1 in the space above the salt to maintain the internal pressure above atmospheric.

In the illustration of the invention, heat is supplied to the salt 10 by a gas or liquid fuel burner 11 which is disposed beneath the tank 1 at the lower end of flue 7. Heat also may be supplied to the salt by a heat pump or an electric heating element rather than the gas burner 11. If an electric heating element is utilized the element may be disposed within the tank 1 in contact with the medium 10, in which case the flue pipe 7 is eliminated.

A heat transfer means is employed to transfer the heat evolved by crystallization together with the sensible heat from the salt 10 to the water. This heat transfer means may take the form of a coiled conduit 12 within which the water to be heated is circulated. Conduit 12 is disposed within tank 1 and is spirally coiled about flue 7 and radially spaced therefrom. Suitable spuds 13 are provided in the top head 3 of tank 1 to join the ends of conduit 12 to the respective water inlet pipe 14 and outlet pipe 15.

It is essential that conduit 12 be constructed of a material with which the heat storage medium will not react and of a material having adequate corrosion resistance to the water flowing through the conduit.

As heat is transferred to the water circulated within conduit 12, crystals of salt 10 forming immediately adjacent to conduit 12 may tend to cling onto the surface of the conduit and to diminish the rate of heat transfer from the salt to the conduit. To insure an adequate rate of heat transfer the conduit may be provided with external fins, not shown, which project outwardly into the salt body 10. The use of fins lessens the area of conduit surface required.

Until most of the salt has been crystallized, a water heater constructed in accordance with this invention can deliver hot water at any rate up to a certain maximum without having an outlet water temperature appreciably below the solidification temperature of the heat storage medium. This maximum rate of hot water delivery at a temperature approximating the solidification temperature is established by the area of surface provided on the conduit for transfer of heat from the medium to the conduit. This same rate of hot water delivery at a temperature approximating the solidification temperature of the heat storage medium can be made constant for an indefinite period of time if the burner or heat source can supply heat to the heat storage medium at a sufficient rate.

The temperature of the molten salt 10 is preferably maintained below the boiling point of the water in conduit 12 at the particular pressure of the water in the conduit to prevent possible scale formation on the inside of the conduit and also to prevent needless heat loss through evolution of steam with the exit water.

The temperature of the salt is maintained within the desired range above and below the crystallization temperature by controlling the burner 11 or other source of heat by a suitable thermostat 16 responding to the temperature of the heat storage medium. Thermostat 16 may be a surface-control type or it may extend inwardly from the tank wall into the heat storage medium, as shown in the drawing. A second thermostat may be incorporated as a safety control to shut off the burner permanently should the first thermostat fail.

A pressure control mechanism 17 may be employed in place of thermostat 16 to control the burner 11 in response to changes in gas or vapor pressure caused by temperature changes in the salt or storage medium 10. This pressure control mechanism 17 may serve as a safety control so that should pressure build up in tank 1 as a result of overheating or decomposition of the salt, the mechanism 17 will operate to shut off the burner, and keep it shut off until the difficulty is corrected. The pressure control mechanism 17 as shown in the drawings is employed in combination with thermostat 16 to act as a safety control for the heater, rather than as a mechanism to take the place of the thermostat.

An external casing 18, comprising a cylindrical section 19 and a top 20 which slips over the cylindrical section, is spaced from tank 1 and adapted to confine an insulating material 21 therebetween. Casing top 20 is provided with suitable openings to permit the water inlet pipe 14, the water outlet pipe 15 and the flue 7 to extend therethrough.

An annular ring 22 is disposed beneath tank 1 and is slipped within the annular periphery of bottom head 4 of tank 1. Ring 22 is inwardly spaced from casing 18 and serves to confine the insulation material 21 at the lower extremity of the water heater.

In operation, the salt or heat storage medium 10 is heated by burner 11 to a predetermined temperature slightly above the crystallization temperature of the salt. Thermostat 16 serves to shut off burner 11 when this predetermined temperature is reached. The salt at this temperature is in the liquid state.

As hot water is withdrawn for use, the cold water entering conduit 12 via inlet pipe 14 is heated to a temperature approximating that of the crystallizing salt. When essentially all of the salt is crystallized, the salt starts to drop in temperature below the crystallization temperature thereof. This slight drop in temperature serves to actuate the thermostat and turns on the gas burner.

Thus, as water is circulated through conduit 12, the molten salt rapidly drops its sensible heat and reaches the temperature of crystallization. The temperature of the salt then remains essentially constant until the major portion of the salt has crystallized as a result of transfer of heat to the water. After complete crystallization of the salt the temperature of the salt will again decline rapidly until thermostat 16 reaches a predetermined temperature and initiates operation of burner 11 to re-heat the salt. This thermostat shuts off the burner when the salt temperature is raised a predetermined amount above the melting temperature of the salt.

Under the invention a substantial quantity of heat is stored in the molten heat storage medium and is transferred to the water as it flows through the heater. The heated water exits at a constant temperature approaching the crystallization temperature of the heat storage medium. The controls 16 and 17 serve to automatically operate the heat source 11 and maintain the heat storage medium 10 within the desired temperature range. These controls also serve to shut off the heat source should overheating or decomposition of salt occur.

Various embodiments of the invention may be employed within the scope of the accompanying claims.

I claim:

1. A water heater for heating water as it flows through the heater, comprising a container, a salt disposed in said container and capable of storing heat when passing from the solid to the molten state and capable of releasing heat of crystallization when passing from the molten to the solid state, means to heat said salt to a temperature above the melting point thereof, a water conduit extending inside the container and surrounded by said salt for carrying water through the container to supply heat to the flowing water from the salt, and means to automatically shut off said heating means when said salt is slightly above its crystallization temperature and to automatically turn on said heating means when said salt is slightly below its crystallization temperature, said salt maintaining a substantially constant temperature for heat transfer during crystallization from the molten state and with the heating means shut off.

2. A water heater for heating water as it flows through the heater, comprising a hermetically sealed container, a hydrated solid heat storage material disposed in said container and capable of storing heat when passing from the solid to the molten state and capable of releasing heat of crystallization when passing from the molten to the solid state, means to heat said material to a temperature above the melting point thereof, a conduit disposed within said container and in contact with said material for conducting water through the container to transfer heat from said heat storage material to said flowing water to heat the latter, temperature responsive means disposed within said container to automatically shut off said heating means when said material is slightly above its crystallization temperature and to automatically turn on said heating means when said material is slightly below its crystallization temperature, said material maintaining a substantially constant temperature for heat transfer during crystallization from the molten state and with the heating means shut off.

3. A hot water heater for heating water as it flows through the heater, comprising a container, a hydrated heat storage medium having water in the form of water of crystallization and disposed in said container and capable of storing heat when passing from the solid to the molten state and capable of releasing heat of crystallization when passing from the molten to the solid state, the temperature for passing of said medium from one state to another being within the range of about 140° F. to 212° F., means to heat said heat storage medium to a temperature required to melt the medium, hollow heat transfer means disposed in said container and in contact with said medium for conducting the water to be heated through the container to transfer heat from said heat storage medium to said flowing water to heat the latter, and means to automatically shut off said heating means when said medium is slightly above its crystallization temperature and to automatically turn on said heating means when said medium is slightly below its crystallization temperature so that the water leaving the heater will be at a substantially constant temperature approximating that of the solidification temperature of the heat storage medium, said medium maintaining a substantially constant temperature for heat transfer during crystallization from the molten state and with the heating means shut off.

References Cited in the file of this patent

UNITED STATES PATENTS

| | | |
|---|---|---|
| 1,790,555 | Plumb | Jan. 27, 1931 |
| 1,916,172 | Koenemann | June 27, 1933 |
| 1,957,741 | Toreky | May 8, 1934 |
| 1,971,139 | Harris | Aug. 21, 1934 |
| 2,220,777 | Othmer | Nov. 5, 1940 |
| 2,402,899 | Knapp | June 25, 1946 |
| 2,630,789 | Smith | Mar. 10, 1953 |
| 2,677,367 | Telkes | May 4, 1954 |